United States Patent [19]

Sherman et al.

[11] 4,272,035

[45] Jun. 9, 1981

[54] LIGHT LOCK FOR ROLL DISPENSING CONTAINER

[75] Inventors: Larry Sherman, Macedon; John J. Niedospial, Rochester, both of N.Y.

[73] Assignee: Eastman Kodak Company, Rochester, N.Y.

[21] Appl. No.: 140,512

[22] Filed: Apr. 14, 1980

[51] Int. Cl.³ .......................... G03B 1/10; G03B 17/26
[52] U.S. Cl. .................................. 242/71.1; 242/71.7
[58] Field of Search ............................. 242/71.1, 71.7; 206/316, 387, 389, 408, 409

[56] References Cited

U.S. PATENT DOCUMENTS

| 1,930,335 | 10/1933 | Bornmann | 242/71.1 |
| 3,404,613 | 10/1968 | MacGregor | 242/71.1 |
| 3,612,424 | 10/1971 | Friedel | 242/71.7 |
| 4,212,389 | 7/1980 | Robbins | 242/71.1 |

Primary Examiner—Edward J. McCarthy
Attorney, Agent, or Firm—M. S. Sales

[57] ABSTRACT

A dispensing container for light-sensitive strip material is pre-loaded with the strip material leader extending through a slot in the container body. The slot has a movable closure member. Once the strip material has been inserted in the container with the leading end extending through the slot, the container is closed by a cover, and the closure member is moved to close the slot.

7 Claims, 6 Drawing Figures

LIGHT LOCK FOR ROLL DISPENSING CONTAINER

BACKGROUND OF THE INVENTION

1. Field of the Invention

The present invention relates to dispensing containers for light-sensitive strip material.

2. Description of the Prior Art

Containers for dispensing unexposed photographic film or paper from a roll into exposure apparatus under roomlight conditions are well known in the art and generally are fabricated of heavy paper, cardboard, or plastic materials. Some such containers are adapted to be loaded by the user, while others are preloaded by the manufacturer and are marketed with one of a variety of photosensitive roll products therein.

Commonly the containers have an elongated slot through which the leading end (referred to herein as the "leader") of the strip material extends for pulling the rest of the strip material from the roll. The slot of so-called "roomlight load" containers must be provided with means to inhibit entry of light as the container is loaded into the exposure apparatus. Conventional means for inhibiting entry of light through the slot includes a fabric-like material, commonly referred to as "plush," on one or both sides of the slot. The plush has a pile depth sufficient to close the slot to light, while permitting the strip material to be pulled therethrough.

Such light inhibiting means are adequate for dispensing strip material, while protecting all but the leader from light prior to being dispensed. However, if the slot is sufficiently narrow to form a good light seal, it presents only a small opening for receiving the leader during film loading. Additionally, the narrow slot makes assembly of the plush material to the walls of the slot difficult.

SUMMARY OF THE INVENTION

In accordance with the present invention, an improved dispensing container for light-sensitive strip material is preloaded with the strip material leader extending through an open slot in the container body. Once the strip material has been inserted in the container with the leading end extending through the slot, the container is closed by a cover. Closure of the cover moves a closure member in the slot to close the slot. In the preferred embodiment, the closure member is cammed shut by a surface on the container cover as the cover is closed.

The invention, and its objects and advantages, will become more apparent in the detailed description of the preferred embodiment presented below.

BRIEF DESCRIPTION OF THE DRAWINGS

In the detailed description of the preferred embodiment of the invention presented below reference is made to the accompanying drawings in which.

DESCRIPTION OF THE PREFERRED EMBODIMENT

Figure 1:
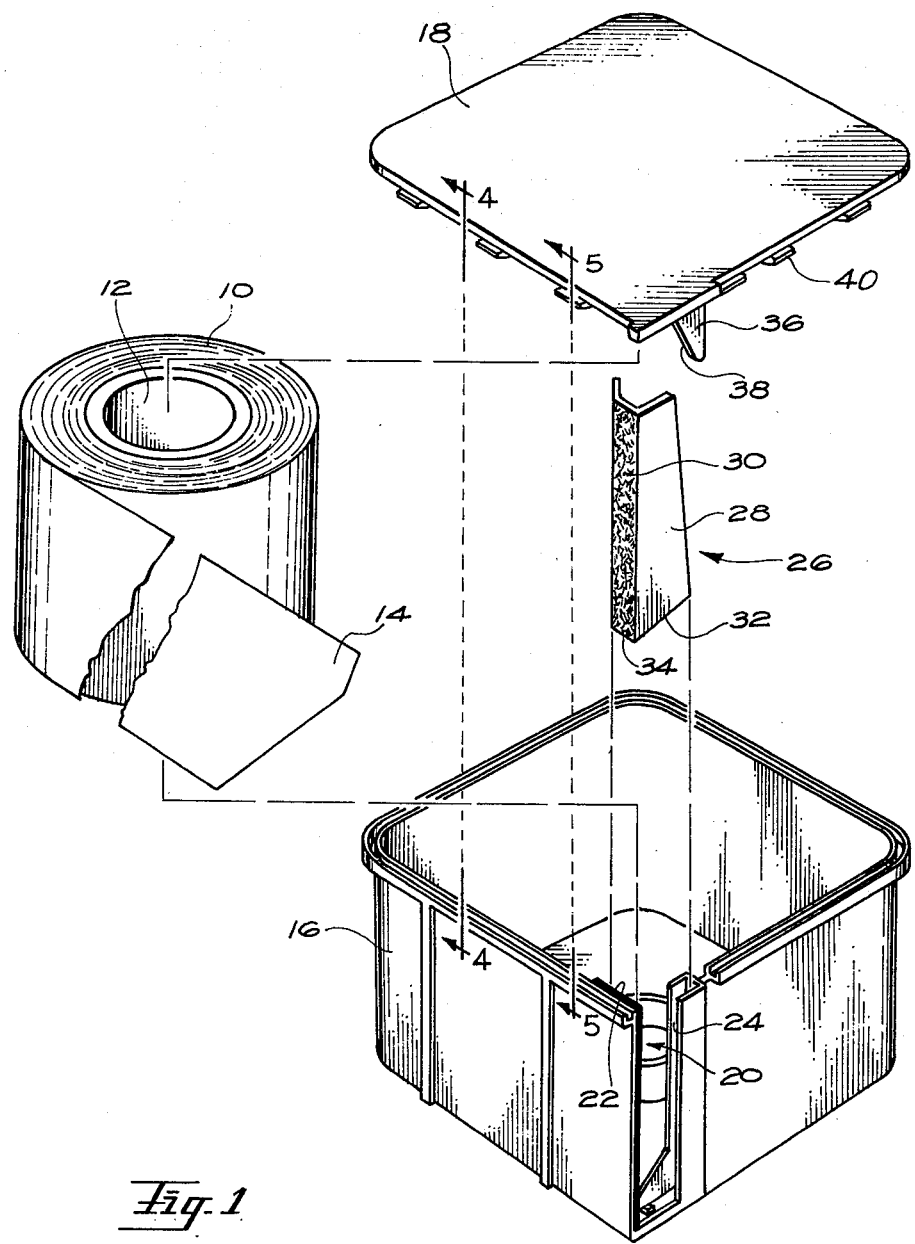
FIG. 1 is an exploded perspective view of a dispenser container in accordance with the present invention and further showing a roll of strip material.

Referring to FIG. 1, a roll 10 of strip material, such as light-sensitive photographic paper or film, is shown with a container formed in accordance with a preferred embodiment of the present invention. The material is wound about a supporting inner core 12 and has a leading end 14 or leader.

The dispenser container includes a molded, tub-like body member 16 having a central cavity and an end cap, or cover, 18. Body member 16 has an opening at one end for loading rolls of strip material, and a slot 20. One edge of the slot has a layer of plush 22 adhered to it, and the other edge has a molded-in channel 24. The slot presents a wide opening for receiving leader 14 of roll 10 when the roll is loaded into the body member.

A light-lock closure member comprising a bar 26 with orthogonal arms 28 and 30 is received in slot 20. Arm 28 extends into channel 24, and arm 30 is provided with plush material. The lower surface 32 of arm 28 is bevelled so that the closure bar is free to rock or pivot about the lower edge 34 of arm 30 when bar 26 is received in slot 20.

Figure 2:
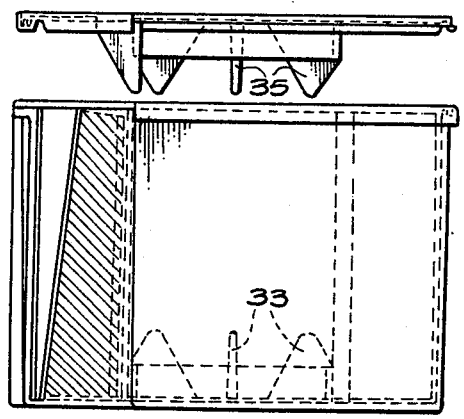
FIG. 2 is an enlarged elevational view of a container of FIG. 1 with the cover removed.

Normally, when a roll 10 is to be inserted into body member 16, the body member will be supported on a generally horizontal surface in an orientation as shown in FIG. 2. Closure bar 26 will, in that orientation, be rocked back by gravity to open slot 20 because the center of gravity of bar 26 is behind the pivot point. This greatly facilitates insertion of leader 14 into slot 20, particularly when such insertion must be carried out in the dark or under "safe light" conditions.

Figure 3:
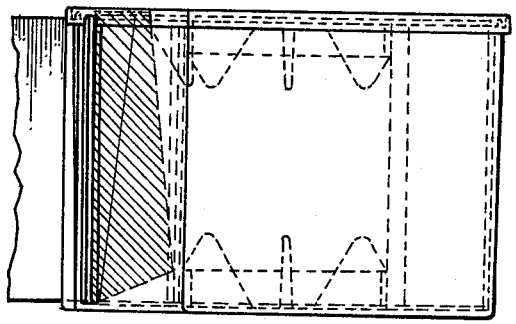
FIG. 3 is a view similar to FIG. 2 with the cover closed and with strip material extending from the container.

The roll is guided into and centered in body member 16 by a plurality of ribs 33 which engages center core 12, and cover 18 is lowered onto the body member guided by a plurality of ribs 35 to complete the container. The cover includes a protrusion 36 with a camming surface 38. As the cover closes onto the body member, protrusion 36 slides into channel 24, and camming surface 38 pushes against the top of closure bar 28. The closure bar rotates about its lower edge 34 until it reaches a position, shown in FIG. 3, closing leader 14 between the two layers of plush. Camming surface 38 and the top surface of closure bar 26 thus comprise cooperative means for moving the closure bar from its slot-open to its slot-closed position.

Figure 4:
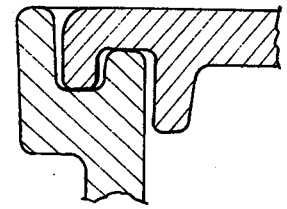
FIG. 4 is a partial sectional view taken along line 4—4 of FIG. 1.

Light-tight integrity of the container is maintained by a cooperating, baffle structure on the periphery of the cover and the upper surfaces of body member 16 to form a tortuous path light-lock, as shown in FIG. 4.

Figure 5:
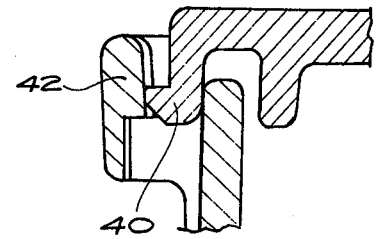
FIGS. 5 and 6 are partial sectional views taken along line 5—5 of FIG. 1 with the cover partially closed and totally closed, respectively.
Figure 6:
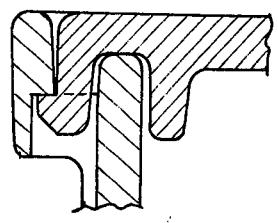

The cover is secured to the body member along the outer perimeter of the cover by a plurality of snaps 40 shown in FIGS. 5 and 6. The snaps protrude through selected openings in the top of the body member wall during the closing motion of the cover. As the closing motion continues, the snaps react against a thin section 42 of the wall (FIG. 5). This section is forced outward by the snap, which then becomes engaged finally to the underside of the wall section as shown in FIG. 6.

The invention has been described in detail with particular reference to a preferred embodiment thereof, but it will be understood that variations and modifications can be effected within the spirit and scope of the invention.

What is claimed is:

1. A container for light-sensitive strip material, said container comprising:
   a body member having (1) a central cavity, (2) a opening through which strip material is loaded into the cavity and (3) a slot through which the leader of the strip material extends when the strip material is loaded in the cavity;
   a cover engagable with said body member to close the opening after the strip material is loaded in the cavity;
   a slot closure member movable in said slot between a slot-open position and a slot-closed position, said closure member being biased to its slot-open position for receiving the leader of strip material loaded in the cavity; and
   cooperative means on said cover and said closure member for moving said closure member to its slot-closed position as said cover closes the opening in said body member.

2. A container as set forth in claim 1 wherein said slot extends to said body member opening.

3. A container for light-sensitive strip material, said container comprising:
   a body member having (1) a central cavity, (2) an opening through which strip material is loaded into the cavity and (3) a slot through which the leader of the strip material extends when the strip material is loaded in the cavity;
   a cover engagable with said body member to close the opening after the strip material is received in the cavity;
   a closure member movable in said slot between a slot-open position and a slot-closed position; and
   a cam surface on said cover, engagable with said closure member, for moving said closure member to its slot-closed position as said cover engages said body member to close the opening in said body member.

4. A container for a roll of light-sensitive strip material, said container comprising:
   a body member having (1) a central cavity, (2) an opening through which a strip material roll is received into the cavity and (3) a slot through which the leader of the strip material extends when the roll is received in the cavity;
   a cover engagable with said body member to close the opening after the roll is received in the cavity;
   a closure member pivotably movable in said slot between a slot-open position and a slot-closed position; and
   cooperative means on said cover and said closure member for pivoting said closure member to its slot-closed position as said cover engages said body member to the opening in the body member.

5. A container for a roll of light-sensitive strip material, said container comprising:
   four walls forming a rectangular body member having a central cavity with at least one open end for receiving the roll, one of said walls having a slot in communication with the one open end of said body member so that the leader of the strip material can be laterally threaded into the slot as the roll is received in the cavity;
   a cover engagable with said body member to close the open end after the roll is received in the cavity;
   a closure member pivotably movable in the slot between a slot-open position and a slot-closed position; and
   cooperative means on said cover and said closure member for moving said closure member to its slot-closed position as said cover closes the opening in said body member.

6. A container as set forth in claim 5 wherein said one wall has a channel therein and said closure member is received in the channel and slidably movable therein between its slot-opened position and slot-closed position.

7. A container for light-sensitive strip material, said container comprising:
   a body member having (1) a central cavity, (2) an open end for receiving the strip material in said body member, and (3) a slot for receiving the leader of strip material received by the cavity through the open end of the body member;
   a cover engagable with said body member to close the open end after the strip material is loaded in the cavity;
   a closure member movable in the slot between a slot-open position and a slot-closed position, said closure member having a center of gravity so as to be gravity urged toward its slot-open position when the open end of said body member is facing upwardly; and
   cooperative means on said cover and said closure member for moving said closure member to its slot-closed position as said cover closes the opening in said body member.

* * * * *